United States Patent
Spivak et al.

(10) Patent No.: US 10,235,095 B2
(45) Date of Patent: Mar. 19, 2019

(54) WEBPAGE REFRESH BASED ON MEMORY CONSUMPTION

(71) Applicant: Hewlett Packard Enterprise Development LP, Houston, TX (US)

(72) Inventors: Ofer Spivak, Yehud (IL); Ben Cohen, Yehud (IL); Haim Litvak, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 176 days.

(21) Appl. No.: 15/334,536

(22) Filed: Oct. 26, 2016

(65) Prior Publication Data
US 2018/0113646 A1    Apr. 26, 2018

(51) Int. Cl.
G06F 12/00    (2006.01)
G06F 3/06    (2006.01)
G06F 11/07    (2006.01)
G06F 17/30    (2006.01)

(52) U.S. Cl.
CPC ............ *G06F 3/0653* (2013.01); *G06F 3/067* (2013.01); *G06F 3/0608* (2013.01); *G06F 3/0613* (2013.01); *G06F 3/0659* (2013.01); *G06F 11/0703* (2013.01); *G06F 11/0754* (2013.01); *G06F 17/30899* (2013.01)

(58) Field of Classification Search
CPC .... G06F 3/0653; G06F 3/0608; G06F 3/0613; G06F 3/0659
See application file for complete search history.

(56) References Cited

U.S. PATENT DOCUMENTS

2009/0132954 A1    5/2009   Cupitt

OTHER PUBLICATIONS

Unknown, jQuery or javascript to find memory usage of page, Retrieved Oct. 10, 2016, 5 Pgs.
EP Search Report; 17196240.0-1871; dated Jan. 3, 2016; 9 pages.
Yi Ming Huang: "Find and resolve browser memory leaks caused by JavaScript and Dojo—Scan and sift with slEve"; ibm.com/developerWorks/; Apr. 5, 2011, pp. 1-10; XP055436094; us Retrieved from the Internet: URL:https://www.ibm.com/developerworks/library/wa-sieve/wa-sieve-pdf .pdf; [retrieved on Dec. 18, 2017].

*Primary Examiner* — Gurtej Bansal (57) ABSTRACT

Examples disclosed herein involve refreshing webpages of a browser based on estimated memory consumption of the browser. A memory consumption of a webpage may be estimated by and a memory consumption threshold may be determined based on characteristics of a computing device executing or implementing the browser. Webpages of the browser are refreshed when the estimated memory consumption satisfies the memory consumption threshold.

14 Claims, 6 Drawing Sheets

WEBPAGE REFRESH BASED ON MEMORY CONSUMPTION

BACKGROUND

A browser or web browser is an application for retrieving, presenting, and traversing information resources on the World Wide Web or Internet. The information resources may be provided via webpages. Browsers and/or webpages of browsers may be used to implement applications (e.g., single page applications (SPAs)). Browsers may present multiple webpages via multiple windows and/or multiple tabs of a window or windows. Like any other application, browsers consume memory and resources of a computing device (e.g., a computer, a mobile device (e.g., a smartphone, a tablet computer, etc.), a server, etc.) executing or implementing the browser.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve estimating memory consumption of a web browser and refreshing a webpage based on the estimated consumption. In some examples, memory consumption thresholds used to trigger a refresh of a webpage or webpages of a browser may be determined and/or adjusted based on characteristics of a computing device executing or implementing the browser. For example, when a webpage or webpages of a browser reach a memory consumption threshold, the webpages may be refreshed to maintain the state of the browser and avoid memory leaks.

In browsers, webpages and/or single page applications (SPAs) of webpages accumulate memory leaks as the webpages or SPAs remain open or running. Accordingly, the users may experience impeded processing speeds (e.g., slowness of the browser and/or other applications) and/or crashes due to the memory leaks as the browser webpages/SPAs remain open until a memory threshold is reached that causes a crash. To avoid slowness or a crash and prevent such accumulation of memory leaks, webpages of the browser may be refreshed to reduce the webpage memory consumption and clear any accumulated memory leaks. In previous techniques, webpages may be periodically or randomly refreshed for this purpose, however, this may result in unnecessary page refreshes, refreshing during user activity, or slowness/crashes because too much memory may be consumed before a future scheduled refresh for the webpage. Accordingly, examples herein enable refresh of webpages of a browser based on an estimated memory consumption of the browser. In many instances, browsers to do not indicate an amount of memory that a browser window or tab is consuming during runtime. Accordingly, examples herein further provide techniques for estimating an amount of memory consumed by a browser, and refreshing webpages based on an estimated amount of memory consumed. In examples herein, memory consumption may be based on execution time of a single thread execution and/or heuristics of accessing particular webpages via the browser. Memory consumption thresholds for determining when to refresh the memory may be set and/or adjusted based on characteristics (e.g., performance, processing capabilities, available resources (e.g., memory), etc.) of a computing device (e.g., a computer, a mobile device (e.g., a smartphone, tablet computer, etc.), a server, etc.) implementing the browser.

An example method includes estimating memory consumption of a webpage of a browser and determining a memory consumption threshold for refreshing the webpage in the browser based on characteristics of a device executing the browser. Further, an example method involves refreshing the webpage in the browser when the memory consumption satisfies the threshold. In examples herein, memory consumption may be estimated based on single thread execution time of webpages measured when accessing the webpages or heuristics from previous accesses to the webpages.

As used herein, memory consumption refers to consumption of memory of a computing device. Accordingly, memory consumption of a browser (or of webpages of the browser) refers to the consumption of memory of a computing device as a result of implementing or executing the browser. Such memory may be a volatile memory or a non-volatile memory of a computing device.

Figure 1:
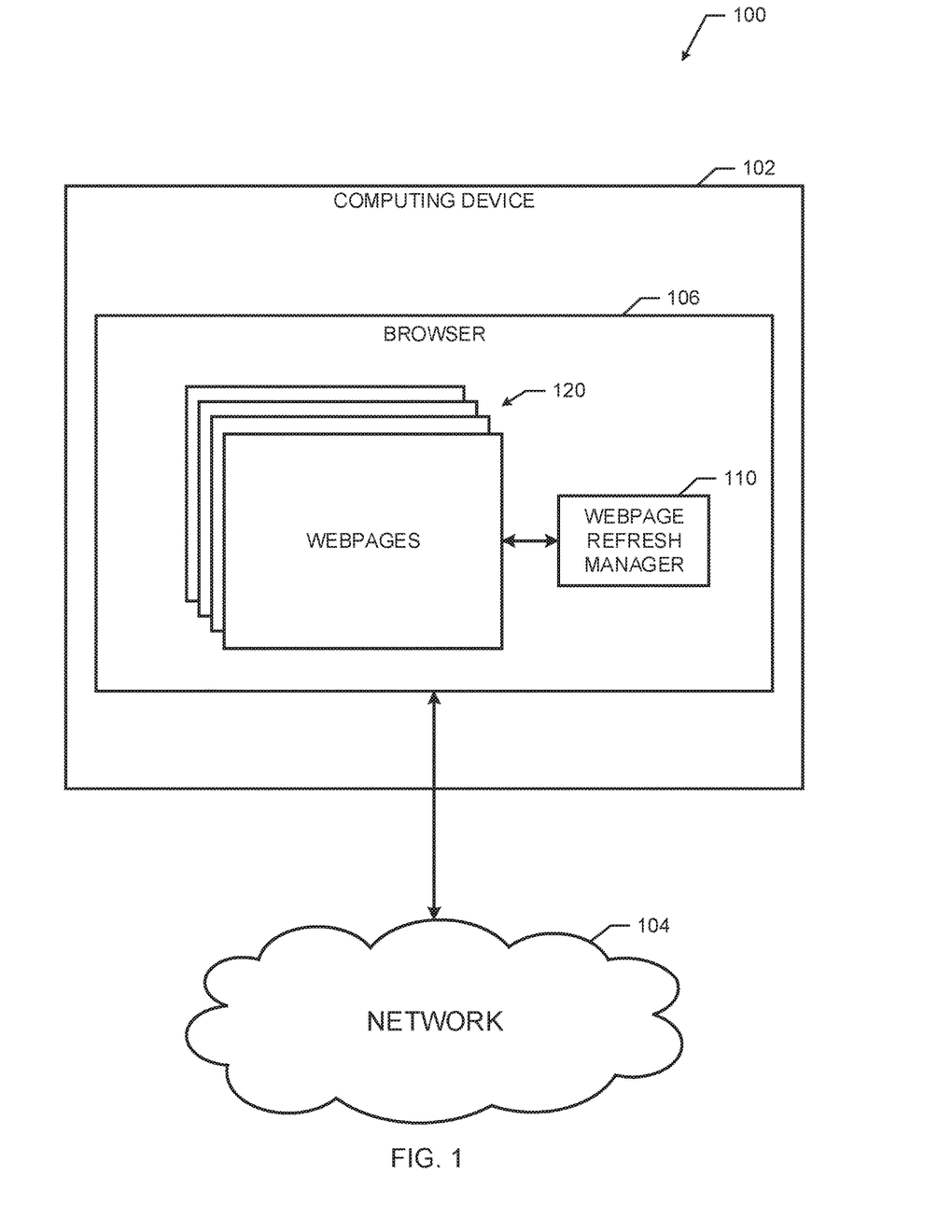
FIG. 1 is a block diagram of an example browser system including a webpage refresh manager implemented in accordance with an aspect of this disclosure.

FIG. 1 is a block diagram of an example browser system 100 including a webpage refresh manager 110 implemented in accordance with examples herein. The example browser system 100 includes a computing device 102 in communication with a network 104. The example computing device 102 may be a personal computer, a mobile device (e.g., a smartphone, tablet computer, etc.), a server, or any other type of computing device. The example network 104 may be the World Wide Web (the Internet), an intranet, a local area network (LAN), a cloud network, etc. The computing device 102 of FIG. 1 includes a browser 106 (e.g., by executing or implementing the browser 106 via a processor and/or machine readable medium of the computing device 102). In examples herein, the webpage refresh manager 110 manages refresh of webpages open (or running) in the browser 106 in accordance with examples herein.

The example browser 106 of FIG. 1 has access to the network 104 and runs webpages 120. The example webpages 120 may include content from the network 104 for presentation and interaction with a user. The example webpages 120 may include single page applications (SPAs) that are managed or run by an entity to provide a service or product to a user. The example webpages 120 may be referred to collectively herein as the "webpages 120" when referring to the webpages 120 running in the browser 106 or individually as "the webpage 120" when referring to one of the webpages running in the browser 106. In examples herein, as the webpages 120 are open in the browser 106, they consume memory of the computing device 102 (e.g., via memory leaks). Accordingly, the longer the webpages 120 are open in the browser 106, the more memory may be consumed by the browser 106. In examples herein, the webpage refresh manager 110 prevents excessive memory consumption by the browser 106 by dynamically refreshing the webpages 120 running the browser based on an estimated memory consumption of the webpages 120.

In examples herein, the webpage refresh manager 110 dynamically refreshes the webpages 120 open in the browser 106 based on an estimated memory consumption and a memory consumption threshold set for the computing device 102. As shown in FIG. 1, the webpage refresh manager 110 may be part of the browser 106 (e.g., as a plugin), though the webpage refresh manager 110 may be an application outside of the browser executing on the computing device 102. The example webpage refresh manager 110 monitors/estimates the memory consumption of the webpages running in the browser 106. Furthermore, the webpage refresh manager 110 may determine the memory consumption threshold for the computing device 120 and/or set the memory consumption threshold to determine when to refresh the webpages 120 running the browser 106. For example, the webpage refresh manager 110 may determine characteristics of the computing device 102 (e.g., performance, processing capabilities, available resources (e.g., memory), etc.) and set the memory consumption threshold appropriately based on the characteristics of the computing device 102 to prevent harming performance or a user experience of the browser 106 and/or computing device 102 such as slower processing speeds, efficiency, or bandwidth.

Figure 2:
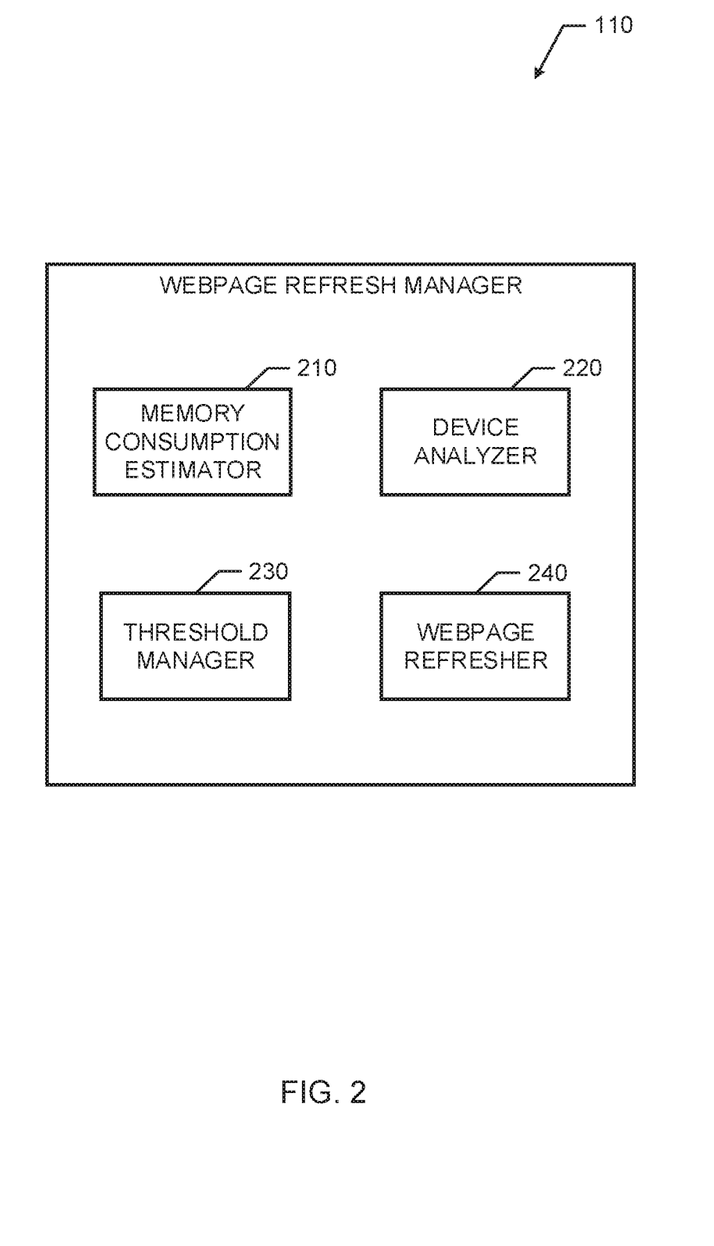
FIG. 2 is a block diagram of an example webpage refresh manager that may be used to implement the webpage refresh manager of FIG. 1.

FIG. 2 is a block diagram of an example webpage refresh manager 110 that may be used to implement the webpage refresh manager 110 of FIG. 1. The example webpage refresh manager 110 of FIG. 2 includes a memory consumption estimator 210, a device analyzer 220, a threshold manager 230, and a webpage refresher 240. In accordance with examples herein, the memory consumption estimator 210 estimates memory consumption by the webpages 120 of the browser 106, the device analyzer 220 determines characteristics of a computing device 102 implementing the browser 106, the threshold manager 230 determines (or sets) a memory consumption threshold for refreshing the webpages and identifies when the memory consumption threshold is satisfied (e.g., reached, exceeded, etc.) by the browser, and the webpage refresher 240 refreshes the webpages 120.

The example memory consumption estimator 210 estimates memory consumption of the browser 106 and/or of webpages 120 of the browser 106 during runtime or while the browser 106 is online. In other words, the memory consumption estimator 210 estimates an amount of memory (of the computing device 102) consumed by the browser 106 or by webpages 120 running on the browser 106. In examples herein, the memory consumption estimator 210 may determine memory consumption of individual webpages of the webpages 120 running in the browser 106 and/or may determine cumulative memory consumption of all webpages running in the browser 106 together (e.g., by accumulating the memory consumption of each of the webpages 120 running the in the browser 106).

In some examples, the memory consumption estimator 210 may estimate the memory consumption of the webpages 120 of the browser 106 using heuristics of accessing the webpages 120. The example memory consumption estimator 210 may determine a grade corresponding to the actual memory consumptions of the webpages 120 from a heuristics database in communication with the webpage refresh manager 110. The example grade may be generated from an actual memory consumption measured from a previous instance that the webpages 120 was/were accessed. In some examples, grades may be generated based on a plurality of actual memory consumptions determined from a plurality of corresponding webpage accesses. For example, the grade may be based on an average memory consumption, a highest memory consumption of the memory consumptions (or a set of memory consumptions, such as a most recently measured set), a memory consumption of a most recent access, etc.

In examples herein, actual memory consumption information may be accessed via development tools (e.g., for the browser 106) to determine memory consumption of the browser 106 during previous accesses of the webpages 120. In many instances, such information from the development tools is not accessible during runtime (or while the browser is being executed/running webpages consuming memory), but is accessible when the browser is offline (i.e., when the browser 106 is not accessing a webpage and/or executing webpage content). Accordingly, a user and/or the webpage refresh manager 110 may retrieve memory consumption data from development tools of the browser 106 after the browser 106 runs/executes the webpages 120. Accordingly, after a diagnostic or initial webpage access, the user and/or webpage refresh manager 110 may populate a heuristics database with memory consumption information corresponding to webpages 120 accessed by the browser 106 as indicated by the browser development tools. In some examples, the heuristics database may be limited to a particular set of webpages accessed by the browser 120. For example, the heuristics database 120 may populate memory consumption information for webpages that have a particular domain (e.g., a domain of an entity seeking to manage memory consumption by a browser and refresh of webpages of the entity in accordance with examples herein). Accordingly, a heuristics database used by the memory consumption estimator 210 to estimate memory consumption for a browser may be for a dedicated entity, domain, or set of webpage(s) (e.g., frequently accessed webpages).

An example heuristics database used by the memory consumption estimator 210 of FIG. 2 may be implemented by an index, a table, a task graph or any other suitable data structure. In examples herein, the heuristics database may be a database stored in a memory or storage device of the computing device 102 and/or stored in a memory or storage device in communication with the computing device 102 (e.g., such as a cloud storage device, a network storage device, or any other type of storage device).

In some examples, the memory consumption estimator 210 may estimate the memory consumption of the webpages 120 of the browser 106 by measuring a length of time (or execution time) of a single thread execution of the webpages to activate a call back. For example, the memory consumption estimator may estimate an amount of time for a JavaScript setTimeout callback to activate and/or an amount of times the JavaScript setTimeout callback is activated during a period of time. Based on the measurements associated with a single thread execution time of a webpage or the webpages 120 of the browser 120, the memory consumption estimator 210 may estimate the amount of memory consumed by the browser 106 and/or webpages 120 of the browser 106. For example, the memory consumption estimator 210 may use or implement an index, a table, or any other type of data structure that indicates memory consumed for particular execution times associated with executing single thread executions of the webpages 120 of the browser 120.

The example device analyzer 220 determines characteristics of the computing device 102 executing the browser 106 to determine a memory consumption threshold for the browser 106. Accordingly, the device analyzer 220 may retrieve or identify characteristics of the computing device 102 from a processor and/or controller of the computing device 102. Such characteristics may include processing capabilities (e.g., processor speeds, configurations/topologies, bandwidth, etc.), memory information (type, capacity, speed, etc.), and performance expectations. Accordingly, the device analyzer 220 may determine and/or estimate how much memory the browser 106 can afford to consume before degrading the performance of the computing device 102 (and thus negatively affecting the user experience). In some examples, the device analyzer 220 may periodically (or aperiodically, such as each time the browser 106 is opened) determine the characteristics of the computing device 102 to account for any potential dynamic abilities of the computing device 102. For example, the device analyzer 220 may determine when a computing device 102 has limited resources (e.g., due to applications other than the browser 106 executing on the computing device), the computing device 102 adding or removing resources, processing power, etc. The example device analyzer 220 may then provide the characteristics of the computing device 102 to the threshold manager 230 to determine a memory consumption threshold for determining when to refresh the webpages 120 of the browser 106.

The threshold manager 230 determines a memory consumption threshold used for refreshing the webpages 120 when the memory consumption threshold is satisfied (e.g., equaled, met, reached, exceeded, etc.) based on the characteristics of the computing device 102 determined by the device analyzer 220. In examples herein, the threshold manager 230 may set an appropriate memory consumption threshold to refresh the webpages 120 of the browser 106 to prevent harm to the user experience of the browser 106 and/or the computing device 102 (e.g., by slowing the computing device 102). For example, if the computing device 102 has relatively weak resources (e.g., a slow processor, less memory, etc.), then the threshold manager 230 may set a lower memory consumption threshold so the webpages are refreshed sooner than if the computing device 102 has relatively stronger resources (e.g., a faster processor, more memory, etc.) so the webpages 120 are refreshed longer.

The webpage refresher 240 may detect when the memory consumption of the browser 106 and/or the webpages 120 of the browser 106 satisfies the set memory consumption threshold based on information from the memory consumption estimator 210. For example, the webpage refresher 240 may retrieve (e.g., via a query) the estimated memory consumption of the browser 106 from the memory consumption estimator 210 and/or periodically or aperiodically receive the estimated memory consumption from the memory consumption estimator 210. The example webpage refresher 240 refreshes the webpage 120 of the browser 106 when the estimated memory consumption of the browser satisfies the memory consumption threshold set by the threshold manager 230. The webpage refresher 240 may use any suitable technique to refresh the webpages 120 (e.g., re-execute or re-access the webpages, recall the content of the webpages 120, etc.).

In some examples, the webpage refresher 240 may perform the refresh of the webpages 120 during a navigation operation of the browser 106. Accordingly, the webpage refresher 240 may detect when the memory consumption threshold is satisfied and wait for the next navigation of the browser (e.g., which may be initiated by a user input or user interaction) before refreshing the webpages 120 of the browser 106 (so as not to refresh the webpages 120 while the user is accessing (e.g., reading) the content of the webpages 120). Accordingly, the webpage refresher 240 may detect that the memory consumption threshold was satisfied, wait for a next navigation operation to be performed, detect that a navigation operation has been initiated, and refresh the webpage in response to the memory consumption threshold being satisfied and the navigation operation being initiated. For example, the navigation operation may be the user navigating to a new webpage in a tab or window of a browser 106 that is separate from webpages that have been loaded and kept in the background for a period of time consuming memory.

Accordingly, the webpage refresh manager 110 may dynamically refresh the webpages 120 of the browser based on an estimated memory consumption of the browser 106 and/or the webpages 120. The webpage refresh manager 110 thus reduces or prevents memory leaks by the browser 106 by refreshing the webpages 120 of the browser 106 based on the estimated memory consumption.

While an example manner of implementing the webpage refresh manager 110 of FIG. 1 is illustrated in FIG. 2, at least one of the elements, processes and/or devices illustrated in FIG. 2 may be combined, divided, re-arranged, omitted, eliminated and/or implemented in any other way. Further, the memory consumption estimator 210, the device analyzer 220, the threshold manager 230, the webpage refresher 240, and/or, more generally, the example webpage refresh manager 110 of FIG. 2 may be implemented by hardware and/or any combination of hardware and executable instructions (e.g., software and/or firmware). Thus, for example, any of the memory consumption estimator 210, the device analyzer 220, the threshold manager 230, the webpage refresher 240, and/or, more generally, the example webpage refresh manager 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the memory consumption estimator 210, the device analyzer 220, the threshold manager 230, and/or the webpage refresher 240 is/are hereby expressly defined to include a tangible machine readable storage device or storage disk such as a memory, a digital versatile disk (DVD), a compact disk (CD), a Blu-ray disk, etc. storing the executable instructions. Further still, the example webpage refresh manager 110 of FIG. 2 may include at least one element, process, and/or device in addition to, or instead of, those illustrated in FIG. 2, and/or may include more than one of any or all of the illustrated elements, processes and devices.

Figure 3:
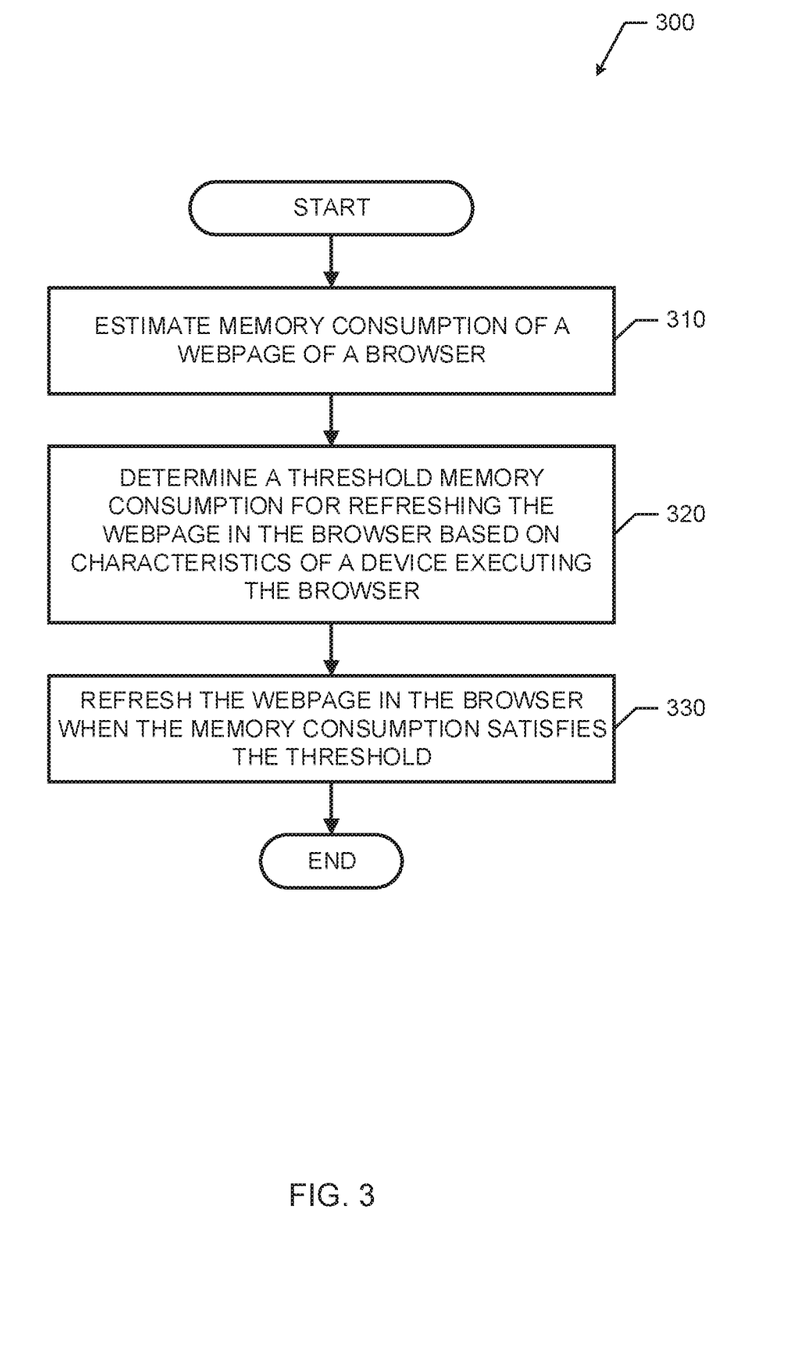
FIG. 3 is a flowchart representative of example machine readable instructions that may be executed to implement the webpage refresh manager of FIG. 2.
Figure 4:
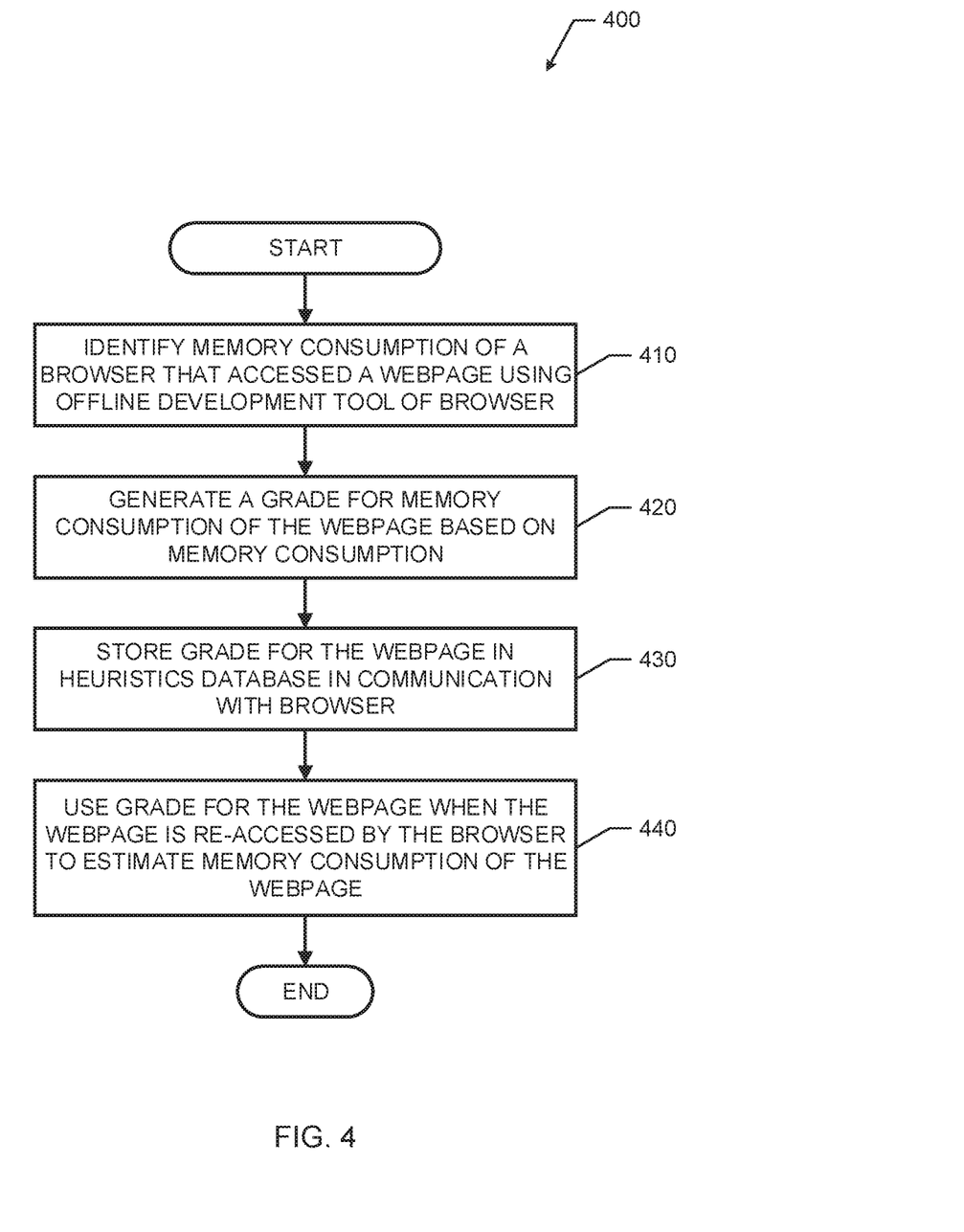
FIG. 4 is a flowchart representative of an example portion of the example machine readable instructions of FIG. 3 to implement the webpage refresh manager of FIG. 2.
Figure 5:
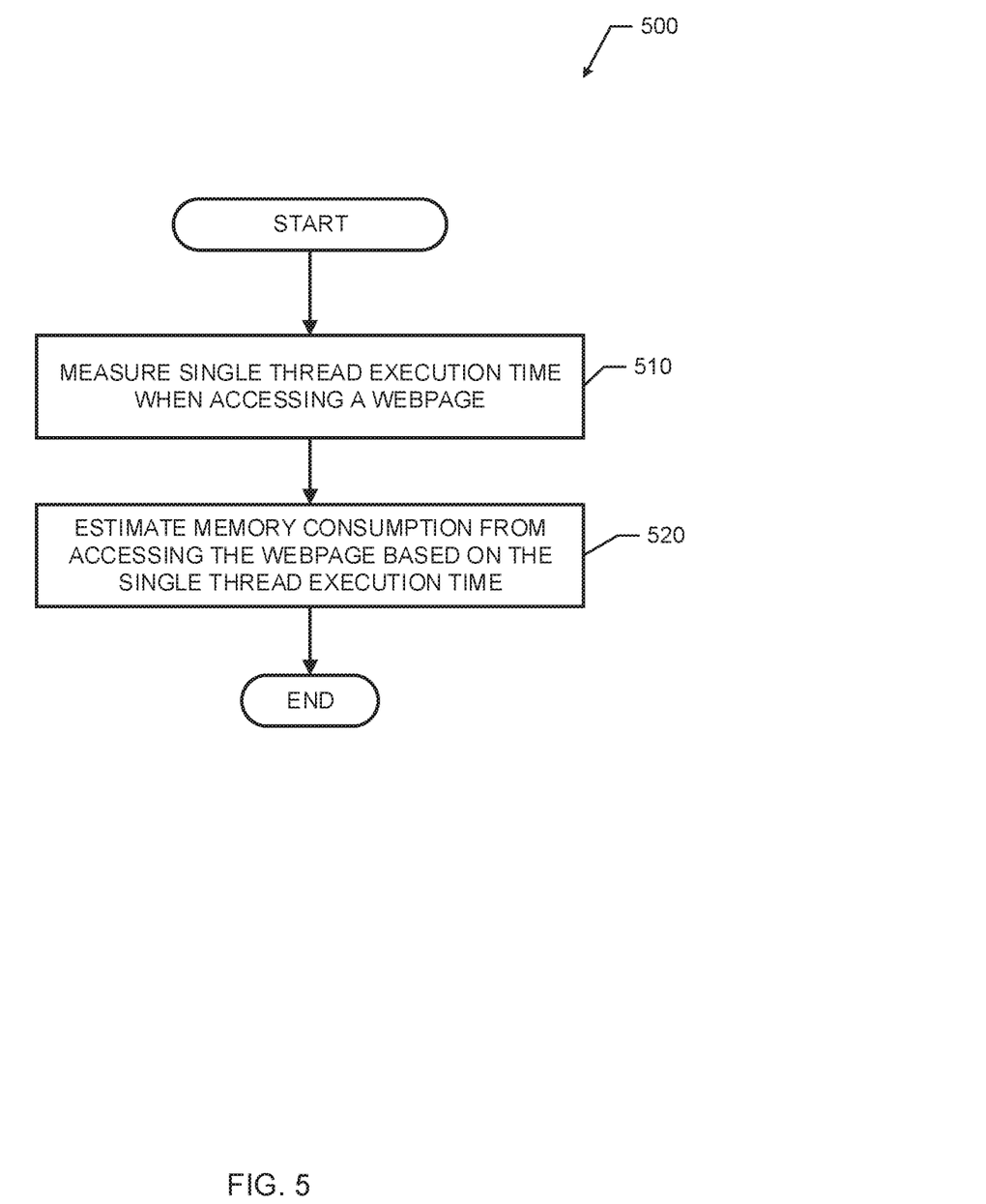
FIG. 5 is another flowchart representative of an example portion of the example machine readable instructions of FIG. 3 to implement a memory consumption estimator of the webpage refresh manager of FIG. 2.

Flowcharts representative of example machine readable instructions for implementing the webpage refresh manager 110 of FIG. 2 are shown in FIGS. 3, 4, and 5. In this example, the machine readable instructions comprise program(s)/process(es) for execution by a processor such as the processor 612 shown in the example processor platform 600 discussed below in connection with FIG. 6. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 612, but the entire program/process and/or parts thereof could be executed by a device other than the processor 612 and/or embodied in firmware or dedicated hardware. Further, although the example program(s)/process(es) is/are described with reference to the flowcharts illustrated in FIGS. 3, 4, and/or 5, many other methods of implementing the example the webpage refresh manager 110 may be used. For example, the order of execution of the blocks may be changed, and/or some of the blocks described may be changed, eliminated, or combined.

The example process 300 of FIG. 3 begins with an initiation of the webpage refresh manager 110 (e.g., upon startup, upon instructions from a user, upon startup of a device or application implementing the webpage refresh manager 110 (e.g., the computing device 102 or the browser 106), etc.). The example process 300 may be executed to dynamically refresh the webpages 120 of the browser 106 based on estimated memory consumption by the browser 106 (or the webpages 120 of the browser 106) in accordance with examples herein. At block 310, the memory consumption estimator 210 estimates memory consumption of a webpage (e.g., one of the webpages 120 of FIG. 1) of a browser (e.g., the browser 106). For example, the memory consumption estimator 210 may estimate the memory consumption based on heuristics for the webpage (e.g., see FIG. 4) or single thread execution time (e.g., see FIG. 5) of the webpage. In some examples, at block 310, the webpages estimator 310 may estimate memory consumption and/or accumulate estimated memory consumption for a plurality of webpages opened in a plurality of tabs or windows of a browser.

At block 320, the threshold manager 230 determines a memory consumption threshold for refreshing the webpage in the browser based on processing characteristics of a device executing the browser. The example processing characteristics of block 320 (e.g., processing power, memory capacity, bandwidth, etc.) may be determined by the device analyzer 220. At block 330, the webpage refresher 240 refreshes the webpage in the browser when the memory consumption satisfies (e.g., reaches, meets, or exceeds) the threshold 330. For example, at block 330, the webpage refresher 240 may monitor the estimated memory consumption estimated by the memory consumption estimator 210 and refresh the webpage when it reaches or exceeds the threshold determined by the threshold manager 230. After block 330, the example process 300 ends. In some examples, the process 300 may be iteratively executed for each webpage opened or running in a browser. In such examples, the webpage refresh manager 330 may refresh webpages of a browser when the accumulated estimated memory consumption satisfies the memory consumption threshold determined by the threshold manager 230.

The example process 400 of FIG. 4 begins with an initiation of the webpage refresh manager 110 (e.g., upon opening of the browser 106 on the computing device 102). The example process 400 of FIG. 4 may be executed to generate a heuristics database of memory consumption of accessing the webpages 120 via the browser 106 and to estimate memory consumption of a webpage using the heuristics of memory consumptions when re-accessing the webpages 120. The example process 400 of FIG. 4 may be executed to implement block 310 of FIG. 3.

At block 410, the webpage refresh manager 110 (e.g., when a browser or webpage is offline) identifies memory consumption of the browser 106 that accessed one of the webpages 120 using an offline development tool of the browser 106. For example, the offline development tool (e.g., an activity report) may provide information on memory consumption of previously accessed webpages 120 while the browser 106 was online. At block 420, the webpage refresh manager 110 generates a grade for memory consumption of the webpage based on the memory consumption. The example grade may be an indication of the memory consumption by the browser when accessing the webpage. For example, the grade may be an identifier (e.g., a number, a letter, etc.) indicating an actual or approximate (e.g., a range) memory consumption of the browser 106 from accessing the webpage 120 (e.g., a Grade of 1 indicates at least 1 MB of memory consumption, a Grade of 2 indicates at least 2 MB of memory consumption, etc.). At block 430, the webpage refresh manager 110 stores the grade for the webpage in a heuristics database in communication with the browser 106 (and/or the computing device 102).

At block 440 of FIG. 4, the memory consumption estimator 210 uses the grade for the webpage 120 when the webpage 120 is re-accessed by the browser 106 to estimate the memory consumption of the webpage 120. Accordingly, while online, the example memory consumption estimator 210 may access a stored grade for the webpages 120 accessed by the browser 106 using heuristics stored in a database accessible by the browser 106 and/or the webpage refresh manager 110. In some examples, the example process 400 may be iteratively executed for each webpage 120 accessed by the browser 106. For example, block 410 may be executed on an initial access of the webpage 120, and blocks 410-440 may be executed each time the webpage 120 is revisited (or re-accessed) by the browser 106, with block 440 being executed while the webpage 120 and browser 106 are online when revisiting the webpage, and blocks 410-430 are executed once the browser goes offline. Furthermore, in such examples, the webpage refresh manager 110 may adjust grades in the heuristics database based on the memory consumption of subsequent accesses to the webpage (e.g., by averaging the memory consumption of previous accesses or a set of previous accesses, by taking the memory consumption of the most recent access, by the taking the highest memory consumption, etc.). In some examples, blocks 410-430 may be executed for a designated set of webpages 120 (e.g., webpages of a common domain of an entity) to populate the heuristics database with grades for the designated set of webpages, and block 440 is executed when the webpages are re-accessed a subsequent time. After block 440, the example process 400 ends. In some examples, after block 440, control may advance to block 320 of FIG. 2.

The example process 500 of FIG. 5 begins with an initiation of the webpage refresh manager 110. The example process 500 may be executed to estimate memory consumption of accessing the webpages 120 using single thread execution time from accessing the webpages. The example process 500 may be executed to implement block 310 of FIG. 3.

At block 510, the memory consumption estimator 210 measures single thread execution time when the browser 106 is accessing a webpage 120. For example, the memory consumption estimator 210 may determine an amount of time (e.g., using a timer) for a JavaScript setTimeout with zero delay to activate a callback or may measure a number of times to activate the callback in a second. At block 520, the memory consumption estimator 210 estimates the memory consumption from accessing the webpage based on the single thread execution time. For example, the memory consumption estimator 210 may implement or use an index or table correlating single thread execution time to memory consumption and estimate the memory consumption of a webpage 120 based on the memory consumption indicated in the index or table corresponding to the measured single thread execution time. Such an index or table may be calibrated or generated using any suitable technique (e.g., using heuristics). After block 520, the example process 500 ends. In some examples, after block 520, control may advance to block 320 of FIG. 2.

As mentioned above, the example processes of FIGS. 3, 4, and 5 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 3, 4, and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
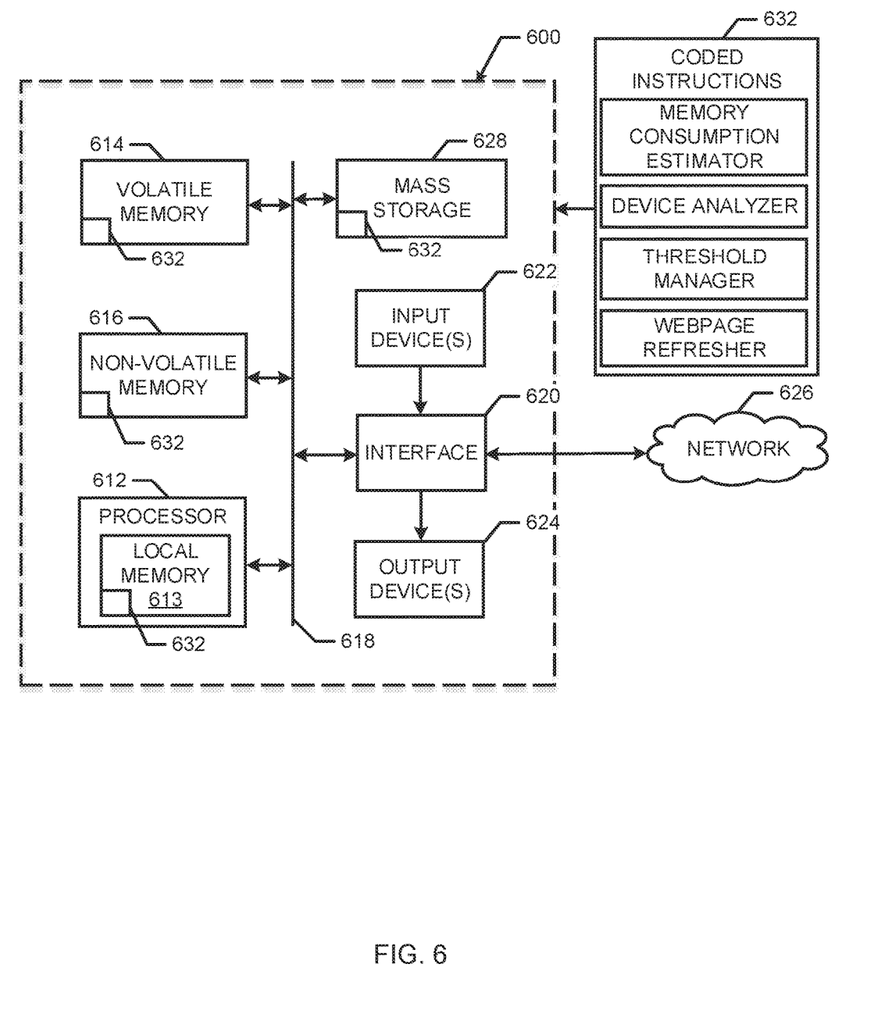
FIG. 6 is a block diagram of an example processor platform capable of executing the instructions of FIGS. 3, 4, and/or 5 to implement the webpage refresh manager of FIG. 2.

FIG. 6 is a block diagram of an example processor platform 600 capable of executing the instructions of FIGS. 3, 4, and/or 5 to implement the webpage refresh manager 110 of FIG. 2. The example processor platform 600 may be or may be included in any type of apparatus, such as a server, a personal computer, a mobile device (e.g., a cell phone, a smart phone, a tablet, etc.), a personal digital assistant (PDA), an Internet appliance or any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory, a persistent, byte-addressable memory accessible via a memory fabric and/or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 3, 4, and/or 5 may be stored in the mass storage device 628, in the local memory 613 in the volatile memory 614, in the non-volatile memory 616, and/or on a removable tangible machine readable storage medium such as a CD or DVD.

The above disclosed methods, apparatus and articles of manufacture may enable dynamic webpage refresh based on estimated memory consumption by a browser. Accordingly, in examples herein, user experience may be enhanced by preventing memory leaks of a browser that result in slowing a system or computing device implementing the browser. Furthermore, examples herein prevent unnecessary webpage refreshes when memory consumption of a browser is not harming the user experience (e.g., because the memory consumption does not reach a threshold to harm user experience as determined based on characteristics of the system or computing device implementing the browser).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A machine implemented method performed by a processor, the method comprising:
    estimating a memory consumption of a webpage of a browser, the estimating comprising determining a grade corresponding to the memory consumption of the webpage from a heuristics database, the grade generated from an actual memory consumption from a previous instance of accessing the webpage via the browser;
    determining a memory consumption threshold for refreshing the webpage in the browser based on characteristics of a device executing the browser; and
    refreshing the webpage in the browser responsive to the memory consumption satisfying the memory consumption threshold.

2. The method of claim 1, wherein the actual memory consumption is indicated by an offline development tool for the browser responsive to the previous instance of accessing the webpage via the browser.

3. The method of claim 1, further comprising refreshing the webpage between navigations of the browser.

4. The method of claim 1, wherein the memory consumption comprises a cumulative memory consumption of a plurality of webpages running in the browser, the plurality of webpages including the webpage.

5. The method of claim 1, further comprising:
    generating the grade based on an average of previous memory consumptions in accessing the webpage, a highest memory consumption of the previous memory consumptions, or a most recently measured memory consumption from a most recent webpage access.

6. A non-transitory machine readable medium comprising instructions that, when executed, cause a machine to:
    measure a single thread execution time of a webpage of a browser;
    estimate a memory consumption of the webpage using the single thread execution time;
    set a memory consumption threshold for refreshing the webpage based on characteristics of a device implementing the browser; and
    refresh the webpage in the browser responsive to the memory consumption satisfying the memory consumption threshold.

7. The non-transitory machine readable medium of claim 6, wherein the instructions, when executed, further cause the machine to:
    measure the single thread execution time of the webpage based on a length of time to activate a callback when running the webpage.

8. The non-transitory machine readable medium of claim 6, wherein the single thread is executed from a JavaScript code of the webpage.

9. The non-transitory machine readable medium of claim 6, wherein the instructions, when executed, further cause the machine to:
    responsive to the memory consumption satisfying the memory consumption threshold:
        wait for initiation of a navigation operation with respect to the webpage,
        detect the initiation of the navigation operation after the waiting, and
        perform the refresh of the webpage in response to detecting the initiation of the navigation operation after the waiting.

10. The non-transitory machine readable medium of claim 9, wherein the instructions, when executed, cause the machine to refrain from performing the refresh while waiting for the initiation of the navigation operation following detecting that the memory consumption satisfies the memory consumption threshold.

11. An apparatus comprising:
    a processor; and
    a non-transitory storage medium storing instructions executable on the processor to:
        estimate a memory consumption of a browser by estimating a memory consumption of webpages running in the browser based on heuristics of previous accesses to the webpages stored in a heuristics database;
        determine characteristics of a computing device executing the browser;
        determine a memory consumption threshold to refresh the webpages; and
        refresh the webpages in the browser responsive to the estimated memory consumption of the browser satisfying the memory consumption threshold.

12. The apparatus of claim 11, wherein the instructions are executable on the processor to accumulate memory consumption of each of the webpages to determine the memory consumption of the browser.

13. The apparatus of claim 11, wherein the instructions are executable on the processor to estimate the memory consumption of the webpages based on memory consumption grades stored in the heuristics database, the memory consumption grades based on a memory consumption of the webpages determined using an offline development tool for the browser.

14. The apparatus of claim 11, wherein the instructions are executable on the processor to refresh the webpages during a navigation of the browser initiated by a user.

* * * * *